H. SWAN.
Stereoscopic Apparatus.
No. 51,906.
Patented Jan'y 2, 1866.
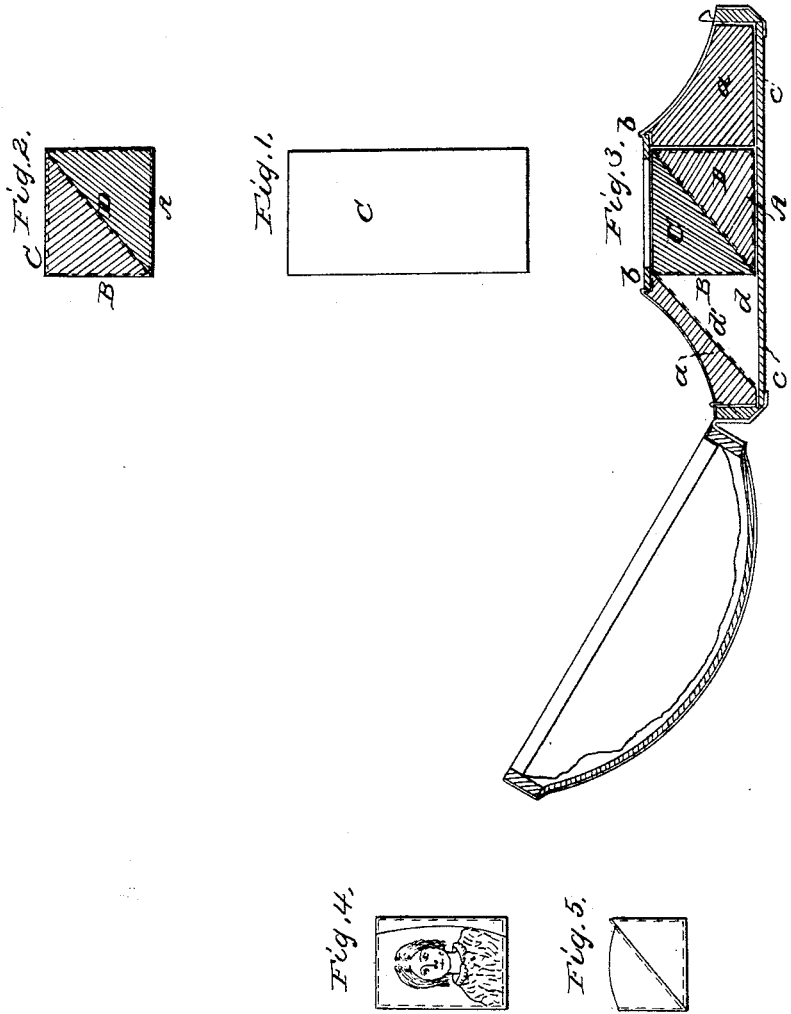
Witnesses:
John Dean
T. A. Brown
Inventor:
Henry Swan

UNITED STATES PATENT OFFICE.

HENRY SWAN, OF No. 40 CHARING CROSS, COUNTY OF MIDDLESEX, ENGLAND.

STEREOSCOPIC APPARATUS.

Specification forming part of Letters Patent No. 51,906, dated January 2, 1866.

*To all whom it may concern:*

Be it known that I, HENRY SWAN, of No. 40 Charing Cross, in the county of Middlesex, England, have invented or discovered certain new and useful Improvements in Stereoscopic Apparatus; and I, the said HENRY SWAN, do hereby declare the nature of the said invention and in what manner the same is to be performed to be particularly described and ascertained in and by the following statement thereof—that is to say—

According to my invention, I combine stereoscopic pictures with pieces of glass or transparent crystal of suitable form in such manner that the pictures, which are in fact depicted on the exterior of the glass or crystal, or on surfaces placed in contact with or at a small distance from them, shall produce an image apparently solid and embedded in a glass or crystal. For this purpose I take two prisms of glass or crystals and place them with a side or surface of the one in contact with a side or surface of the other. The prisms each have one of their angles a right angle, or nearly so, and they are so placed together that they produce a solid having parallel sides. The stereoscopic pictures are either produced on, applied to, or placed near the adjacent sides of this solid, one picture on one prism and the other on the other. On looking at one of the sides of the solid unoccupied by a picture the image is seen, the light from one picture coming from it through the two prisms and direct to one of the eyes of the observer, while the light from the other picture is reflected at the surfaces of the prisms which are in contact, and is thus directed to the other eye of the observer. The picture, which is reflected before coming to the eye, will be reversed, side for side, by the reflection. This is compensated for by a corresponding transposition in the picture itself. The side of the prism through which the pictures are viewed is in some cases made convex, the image is then seen magnified more or less, according to the degree of convexity.

Figure 1 is a plan, and Fig. 2 is an end, of a pair of prisms such as I employ. Their longest sides are placed in contact the one with the other, as the drawings show. One angle of each prism is a right angle, and the other two angles forty degrees and fifty degrees, respectively, or thereabout. One picture of the stereoscopic pair is either mounted or produced on one side of one of the prisms, as is indicated by the red line at A, Fig. 2, while the other picture is mounted or produced on a side of the other prism, as is indicated by the red line at B. If the observer then looks at the side C of the second prism he sees the picture A by direct vision, and the picture B as reflected at the inclined side of the prism at D, and, these images occupying the same apparent positions and being stereoscopic, the effect of solidity is obtained, as before mentioned. The picture B will be reversed, side for side, by the reflection, and allowance for this effect should be made in arranging the pictures.

Fig. 3 is a transverse section of the same prisms as they appear when mounted in a manner which I have found convenient. The prisms are here mounted in a frame, *a*, conveniently covered with velvet, and they are retained in their place by a shield or mat, *b*. The back of the case *c* is made of white enameled glass, and there is a hollow in the case at *d*, which, at the back *d'*, is a reflector conveniently of tin-foil or white paper. In viewing the pictures the case is held up to the light, and the light then passes, in part, through the white glass, the picture A, and the prisms to the eye, and in part it passes through the white glass and falls on the reflecting-surface *d'*. By this it is directed through the picture B into the upper prism, and it is again reflected internally on striking the inclined side of the prism. This last reflection directs this portion of the light to the eye of the observer.

Figs. 4 and 5 show prisms similar to those shown at Figs. 1 and 2, except that the side through which the picture is viewed is made convex, to magnify the pictures.

In place of mounting the prisms, as above described, they are (more especially when of small size) conveniently mounted by surrounding the prisms on three sides with white enameled glass or cornelian, leaving uncovered only the side through which the observer looks at the pictures. Pictures thus mounted may be worn as lockets or carried on a watch-chain.

The apparatus may also, if desired, be made of large size. It is then convenient to employ prisms of water contained in glass vessels, and (when a certain size is exceeded) it becomes necessary to regulate the illumination of the pictures, so that the light coming from a direction directly, or nearly directly, opposite to each picture is confined to such a space as to reach that particular eye only for which it is intended.

Having thus described the nature of my invention, and the manner in which it is performed, what I claim is—

The combination of stereoscopic pictures, prisms, and frames with reflectors, substantially as herein described.

HENRY SWAN.

Witnesses:
 JOHN DEAN,
 T. A. BROWN,
  No. 17 *Gracechurch Street, London.*